Jan. 20, 1953  R. N. SABEE  2,626,145
TISSUE INTERFOLDING METHOD AND APPARATUS
Filed April 5, 1947  6 Sheets-Sheet 1

Inventor:
Reinhardt N. Sabee
By:
Evans, Pond & Anderson
Attys.

Jan. 20, 1953  R. N. SABEE  2,626,145
TISSUE INTERFOLDING METHOD AND APPARATUS
Filed April 5, 1947  6 Sheets-Sheet 3

Inventor:
Reinhardt N. Sabee
By:
Evans, Pond & Anderson
Attys.

Jan. 20, 1953    R. N. SABEE    2,626,145
TISSUE INTERFOLDING METHOD AND APPARATUS
Filed April 5, 1947    6 Sheets-Sheet 4

Inventor:
Reinhardt N. Sabee
By: Evans, Paul & Anderson
Attys.

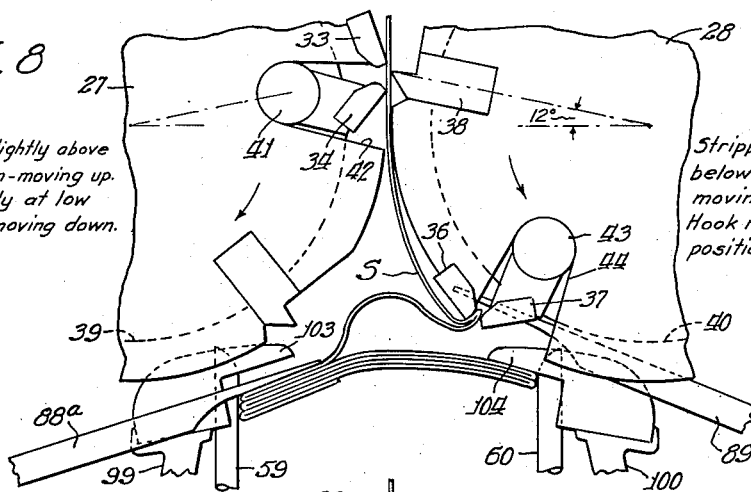
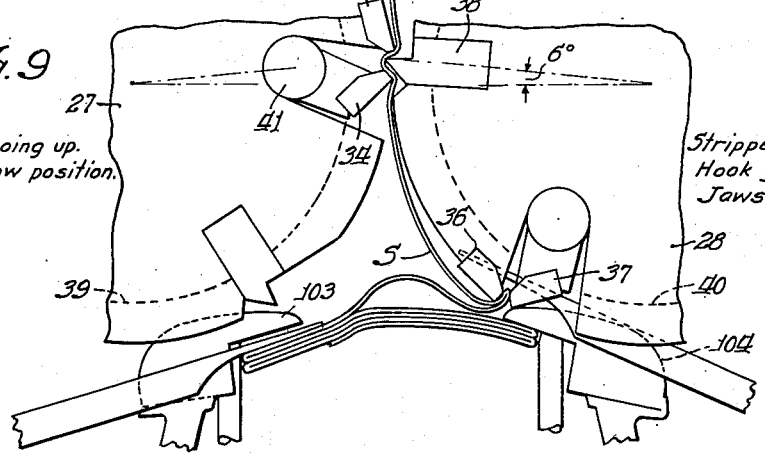
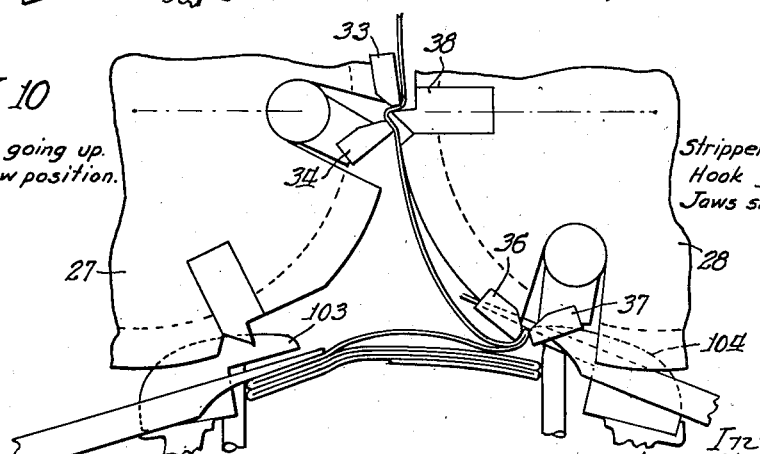

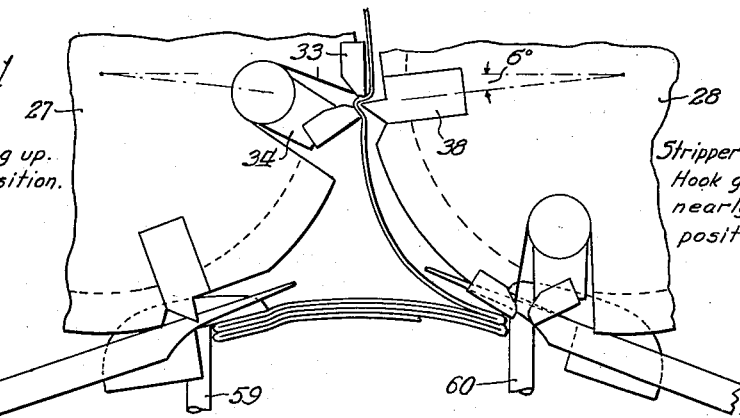
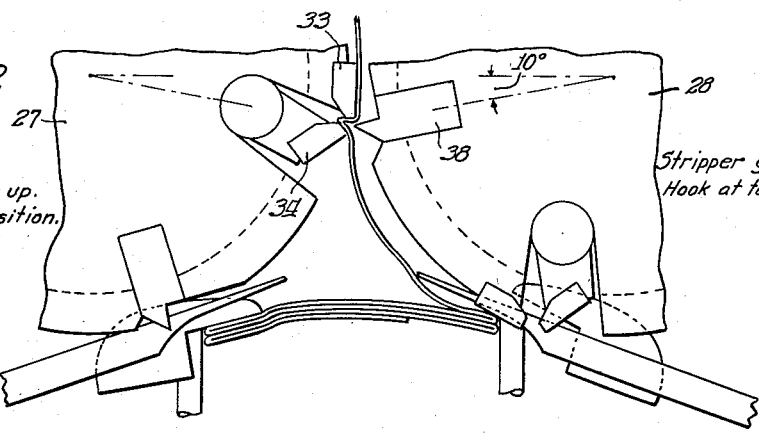
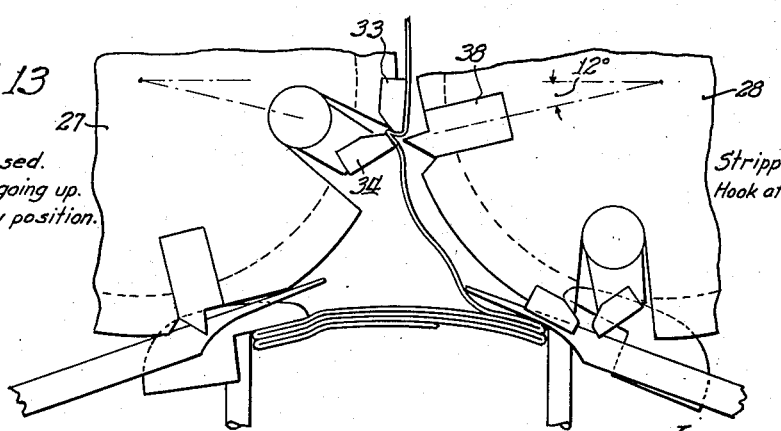

Patented Jan. 20, 1953

2,626,145

UNITED STATES PATENT OFFICE 2,626,145

TISSUE INTERFOLDING METHOD AND APPARATUS

Reinhardt N. Sabee, Appleton, Wis., assignor to International Cellucotton Products Company, Chicago, Ill., a corporation of Delaware Application April 5, 1947, Serial No. 739,563

11 Claims. (Cl. 270—73)

This invention relates to a tissue folding method and apparatus, and it is particularly (but not exclusively) concerned with a method and apparatus for interfolding thin, light-weight tissues of a soft, flimsy character having but little tensile strength.

In one form of commercial packaging of facial tissues which are typical of one kind of material which may be folded, two continuous webs of tissue paper (often having two or more plies) are separately fed between cutting rolls which sever the webs transversely in such a manner as to leave a few very slight bonds connecting the web portions on opposite sides of the line of severance. Such webs are then fed into face-to-face relation with the lines of severance of one web in staggered relation to the lines of severance in the other, after which the sheet areas between succeeding lines of severance are folded approximately midway between the lines of severance. Folding is effected in such a manner that the bonds connecting successive sheet areas of one web are enclosed between the folds of the other web and preferably at the fold line thereof. The resulting interfolded stack of tissue may be enclosed in a box from which the sheet areas may be successively withdrawn and the leading end of each sheet area automatically pulled out of the box upon withdrawal of the preceding sheet.

In order that only one sheet at a time be withdrawn, it is important that the bonds be quite weak so as to be easily broken upon the application of a small increment of resistance to withdrawal of the next section of the same web, while at the same time being strong enough to avoid breakage merely by reason of the slight resistance created incident to the pulling of the leading end portion of the other web out of the box. The frailness of the bonds required is such that in most known interfolding machinery (much of which is used for interfolding relatively strong paper webs such as paper towels) is not operative to interfold weakly bonded tissue material without breaking the bonds.

The preservation of these bonds is especially important when interfolded tissue is to be packed in boxes of considerable depth (such as typified by facial tissue boxes containing four or five hundred sheets) in which it is especially desirable that the withdrawal of one sheet should automatically bring to an accessible position, through a narrow dispensing slot, the leading end of the next sheet. Breakage of the bonds would, of course, prevent such automatic feeding of the sheets. This preservation of bond is also highly desirable in connection with the packaging of continuous Z-folded material which may be also produced by the method and apparatus to be described.

The main objects of the present invention are to provide a method and apparatus for folding and/or interfolding tissue materials of the character indicated, and to provide a method and apparatus which will be operative at a very high rate of speed.

Other objects and advantages of the invention will be understood by reference to the following specification and accompanying drawings (5 sheets) wherein there is illustrated a folding method and machine embodying a selected form of the invention.

Figs. 8 to 13, inclusive, are more or less diagrammatic views illustrating successive positions of the principal operating elements of the mechanism.

Figure 1:
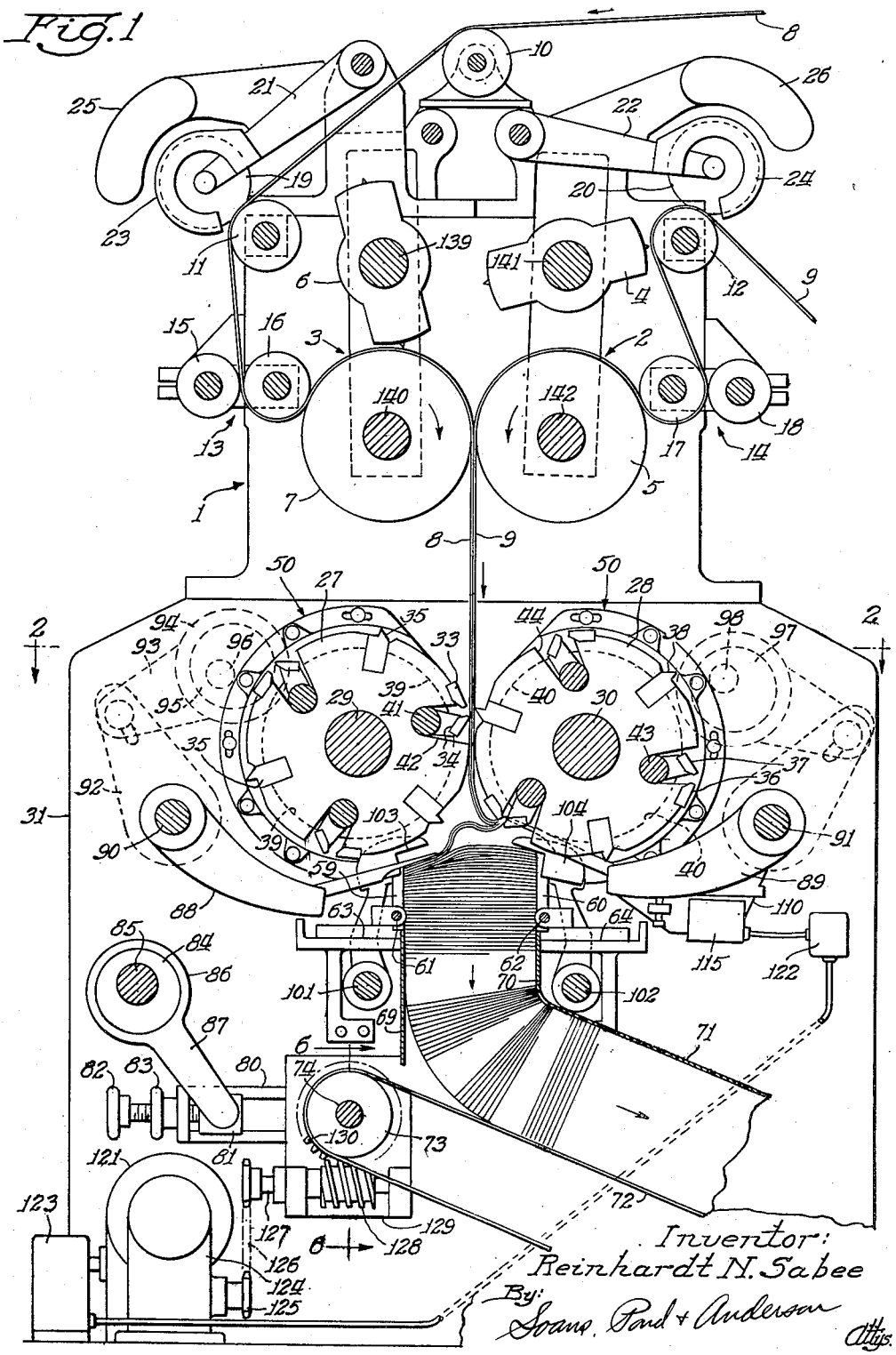
Fig. 1 is a vertical section through the working parts of the machine.

As shown in Fig. 1, the machine embodies a unit of mechanism designated in its entirety by the reference numeral 1, said unit embodying cooperating cutter roll pairs 2 and 3, the roll pair 2 embodying a knife roll 4 and an anvil roll 5 and the roll pair 3 embodying similar knife and anvil rolls 6 and 7, respectively. Paper webs 8 and 9 are fed over suitable guide rolls 10 and 11 for the web 8 and a roll 12 for the web 9 to feed roll pairs 13 and 14, respectively. The feed roll pair 13 embodies cooperating rolls 15 and 16, at least one of which is positively driven at a predetermined rate of speed to effect travel of the web 8 at the desired rate of travel. Similarly, the roll pair 14 comprises rolls 17 and 18, at least one of which is positively driven at a predetermined rate of speed to propel the web 9 at the required speed which is the same as the speed of travel of the web 8. The rolls of the feed roll pairs 13 and 14 are preferably adjustably mounted so as to facilitate control of the pressure with which the webs fed between them are gripped by the respective roll pairs. The specific means for mounting these rolls forms no part of the present invention, and is, therefore, not described in detail.

In the arrangement illustrated, the knife and anvil rolls of the cutting roll pair 3 are so set with respect to the knife and anvil rolls of the cutting roll pair 2 that the successive lines of severance formed in the web 8 will be located substantially midway between successive lines of severance formed in the web 9 when the webs 8 and 9 are delivered in face-to-face relation from between the anvil rolls 5 and 7 as shown in Fig. 1.

Commercial forms of facial tissue are usually in the neighborhood of ten inches in width. It is convenient to interfold a double width of tissue and to subsequently break the double width into separate sections of the required width. Accordingly, the apparatus is provided with slitters 19 and 20 carried on the free ends of the arms 21 and 22, respectively, which are suitably pivotally mounted through the agency of supporting shafts carried by the frames of the upper unit of mechanism.

The slitters 19 and 20 are preferably enclosed by suitable guards 23 and 24 which are carried by the arms 21 and 22, and weighted arms 25 and 26 associated with the respective slitter arms 21 and 22 serve to urge the slitters 19 and 20 toward the respective guide rolls 11 and 12 with sufficient force to slit webs 8 and 9 longitudinally intermediate their widths. The slitting is not quite complete and does not actually separate the webs into two strips, sufficient but easily breakable bonding remaining to preserve continuity of the divided webs.

The mechanism for Z-folding and for interfolding the paper, is supported by side frames immediately below the above-described web feeding, slitting and severing mechanism. The webs 8 and 9 in face-to-face relation travel downwardly between a pair of folding rolls 27 and 28 which are carried respectively by shafts 29 and 30 which are suitably journalled in the side frames 31 and 32, respectively, of the mechanism (see Fig. 2). The rolls 27 and 28 are so mounted relative to each other that their surfaces are spaced apart a distance which will cause the rolls to guide the webs 8 and 9 downwardly between them without gripping or exerting any positive feeding effect. The rolls are continuously rotated in opposite directions, the roll 27 being rotated clockwise and the roll 28 counterclockwise as viewed in Fig. 1.

Each of the rolls 27 and 28 carries three sets of jaws and three tuckers, the tuckers being located intermediate the pairs of jaws. In the present embodiment of the invention, three pairs of tuckers and three jaws are employed, but it is apparent that by using smaller or larger carrying rolls, or to adapt the apparatus to the interfolding of tissue sheets of shorter or longer length than those for which the present machine is designed, or for other reasons, the number of jaws and tuckers may be varied.

The roll 27 is provided with jaw pairs each embodying a fixed jaw element 33 and a movable jaw element 34. The tuckers provided in the roll 27 are indicated by the reference numeral 35, these tuckers being fixedly mounted in the roll. Similarly, the roll 28 has tucker jaws comprising a fixed jaw 36, a movable jaw 37 and fixed tuckers 38. The jaws and tuckers extend for the entire length of the respective rolls, but they are grooved transversely in conformity with the grooves provided in the rolls 27 and 28 for the reception of certain elements which will presently be described. Certain of such grooves are indicated at 39 and 40 in the rolls 27 and 28 respectively, in Fig. 1. The movable jaws 34 are formed with short shaft sections 41 intermediate the lengths of the jaws and at their ends. The jaws are rockably positioned in grooves 42 in the body of the roll 27. Similarly, the movable jaws 37 of the roll 28 are provided with intermediate and end shaft sections 43, and grooves 44 in the roll receive the jaws. The intermediate shaft sections 41 and 43 are located in alignment with the grooves 39 and 40 and in the respective rolls and are seated in bearing surfaces prepared for that purpose. Bearing caps 45 and 46 bolted to the rolls 27 and 28 over the jaw shaft sections hold the jaws in place.

Figure 2:
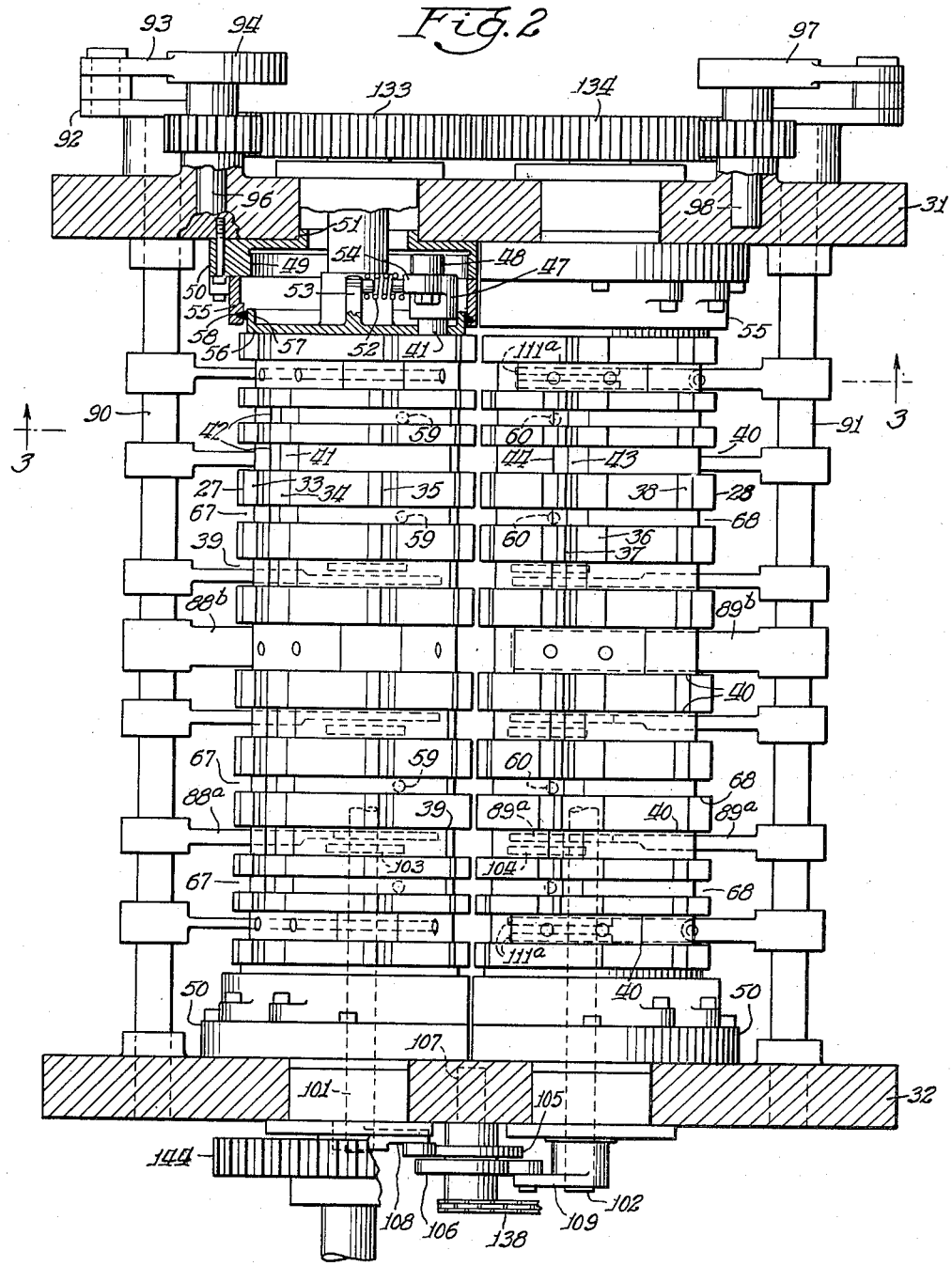
Fig. 2 is a plan section on the line 2—2 of Fig. 1.
Figure 3:
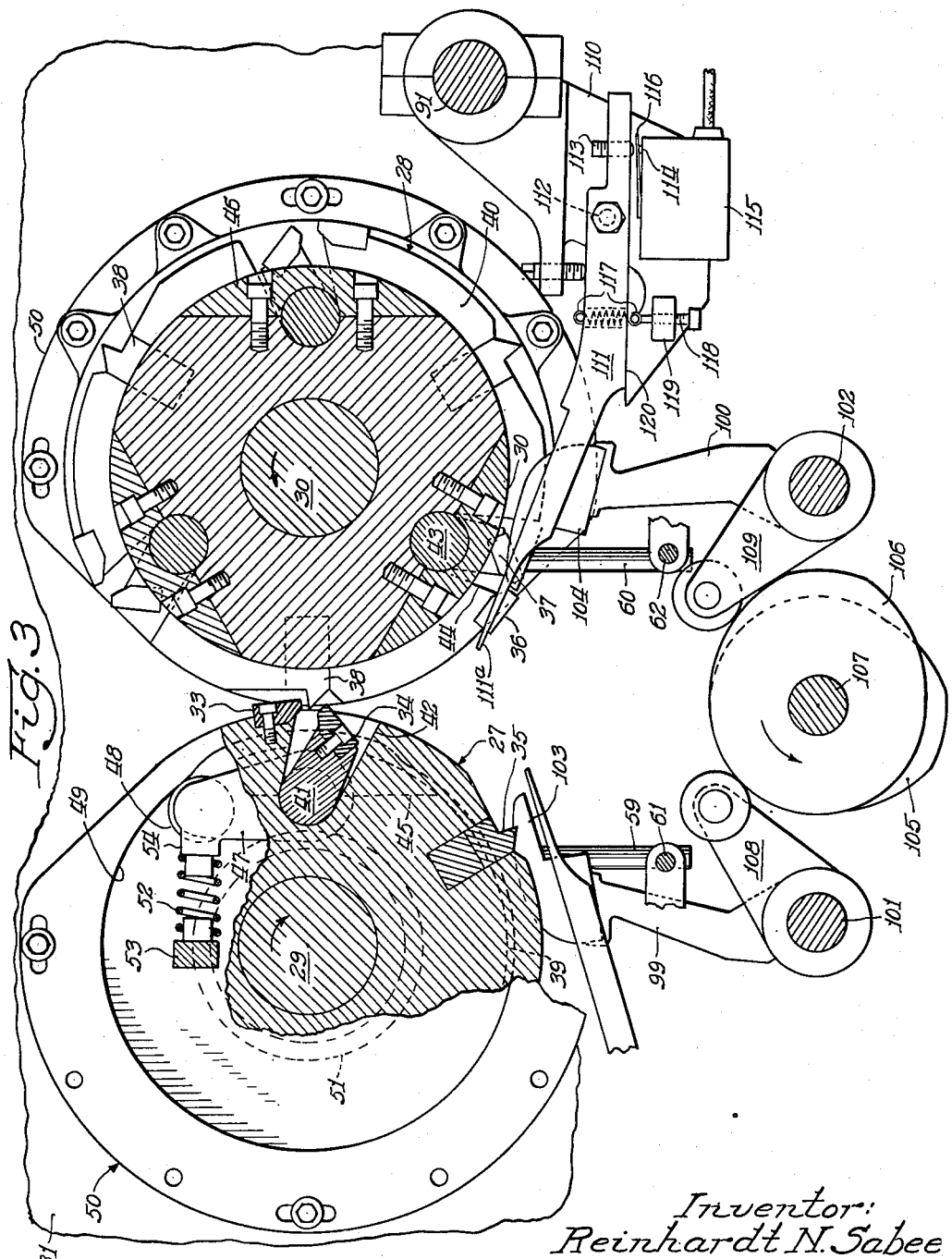
Fig. 3 is a vertical section corresponding in part to Fig. 1 but taken in a different plane, certain parts being broken away to better illustrate certain operating details.

The end shaft sections 42 and 43 which project beyond the ends of the rolls are provided with arms which carry rolls at their free ends for engagement with cams whereby the jaws may be rocked in predetermined synchronism with cooperating elements of the mechanism. One of the cam-operating mechanisms is shown in Fig. 2 wherein the projecting end shaft 41 of the roll 27 is shown as being provided with an arm 47. The arm 47 is provided at its free end with a roller 48 for engaging the internal cam surface 49 carried by a cam body 50 which is rotatably adjustably mounted as indicated at 51 in the frame 31 in co-axial relationship to the shaft 29 of the roll 27. The roller 48 is urged into engagement with the cam surface 49 by means of a spring 52 (see Fig. 3) compressed between spring seats 53 and 54, the spring seat 53 being fixedly mounted on the member 56 which is fastened on the end of the roll, and the spring seat 54 being carried by the free end of the arm 48. To prevent the accumulation of lint and other foreign material on the surface of the cam 49, the space between the end of each roll and its associated cam is closed by means such as circular housing elements 55 which are bolted or otherwise secured to the adjacent ends of the cam bodies 51, and said roll end members 56 which have flanges 57 spaced inwardly from the housings 55. The space between the housings 55 and flanges 57 is sealed by suitable packing rings such as represented at 58.

As shown in Fig. 1, the rolls 27 and 28 with their alternate jaw pairs and tuckers are so related to each other that each tucker and one roll cooperates with a pair of jaws of the other roll. The arrangement is such that each tucker tucks the webs 8 and 9 of tissue into the opposite or cooperating jaw pair while the jaws are open, the tucker being also fully withdrawn from between the jaws before they close and before the jaws actually grip the tucked in webs. This method of operation is clearly illustrated in Figs. 8 to 13, inclusive, in which Fig. 8 illustrates the position of a tucker and its cooperating jaw pair at about the time of first contact thereof with the web to be folded (or the webs to be interfolded). In the present embodiment, this position occurs when the point of the tucker 38 is located in registry with a radius extending upwardly at an angle of about 12° from a horizontal radius of the roll.

Figs. 9 and 10 show succeeding positions and corresponding web positions, Fig. 9 representing a position in which the point of the tucker is in registry with a radius extending upwardly at an angle of 6° from a horizontal radius of the roll 28, and Fig. 10 representing the condition in which the tucker point is in registry with the horizontal radius of the roll 28. It may be observed that the axes of the rolls 27 and 28 are in the same horizontal plane.

In the tucker position shown in Fig. 10, it has, of course, reached its position of greatest penetration between the jaws 33 and 34. The subsequent travel of the tucker results in withdrawal thereof from between the jaws as clearly shown in Figs. 11 to 13. Fig. 11 shows the tucker position in which the point of the tucker is in registry with a radius of the roll 28 extending downwardly at an angle of 6° from the horizontal radius. In that position the tucker point is still between the jaws, but it will be observed that the jaws have not yet closed and that the web is not positively gripped either between the jaws or between either jaw and the tucker.

Fig. 12 shows a further advanced position of the tucker and jaws in which the point of the tucker registers with a radius of the roll 28 extending downwardly at an angle of 10° from the horizontal, the tucker being there completely withdrawn from between the jaws, and the movable jaw in a position nearer to the stationary jaw 33 but not yet fully closed. In other words, the tucker has completed its operation of tucking the web between the jaws and has been withdrawn from between them without the webs having been gripped between the jaws or between either jaw and the tucker. As represented in Fig. 13, the jaws have closed and the tucked-in portion of the web is effectively gripped between the jaws. This position results from a further movement of approximately 2° downwardly from the position represented in Fig. 12.

In order that the movable jaws shall require a minimum amount of travel from open to closed position, the tucker is made with its rear face at a slight angle to a roll radius which passes through the point of the tucker. The angle may vary somewhat and is here shown as being about 7° rearwardly with reference to the direction of travel of the tucker and roll. The fixed rear jaw which cooperates with the rear face of the tucker approaches said tucker face quite closely during the tucking operation but does not come close enough to pinch the paper web (or webs) against the tucker. The front or movable jaw is initially spaced from the more angular front face of the tucker a greater distance than the rear jaw is spaced from the rear face of the tucker but gradually approaches said front face merely as an incident to the rotation of the rolls and without imparting any closing movement to the jaw about its axis of pivotal movement. Pivotal movement of the movable jaw, effected by the cam arrangement already described, is effected during a relatively small travel distance; such jaw pivoting begins at about the time that a cooperating tucker and jaw pair are centered on a horizontal line extending between the axes of the rolls 27 and 28, proceeds gradually so as to avoid any pinching of the web against the face of the tucker and is not closed to grip the web against the fixed jaw until the tucker is completely withdrawn as shown in Fig. 13.

For practical reasons, the jaw closing movement is effected over about 10 to 15 degrees of roll travel although it would be desirable to complete such movement in a shorter distance, i. e. almost instantaneously after the tucker is withdrawn. Such instantaneous movement, at high operating speeds, is practically impossible of attainment without resorting to costly, delicate mechanism which would not be practicable in a production machine such as is being described.

After the jaws are closed, they remain closed until the gripped web fold is just about over the edge of the stack in which the folded material is deposited. The pivoted jaw is then opened at a speed which is somewhat faster than its closing speed, for example, in about 5 to 10 degrees of travel, the opening being so timed that the web fold may be discharged at the proper time as hereinafter explained, the discharge being effected even before the jaws reach their fully opened position. The discharge of the folded web from a pair of jaws is represented in Figs. 8 to 13, inclusive, in respect of the jaws of the roll at the right hand side of the figures.

The jaws 33 and 34 (and the jaws 36 and 37) are preferably tipped or faced with material which offers a significant degree of frictional resistance to movement of the webs across the surfaces of the jaws. In one operative embodiment of the invention, these jaws are formed of synthetic rubber (neoprene) having a value of approximately 60–62 as determined with a Pusey & Jones plastometer, the measurement being made with a 1/8 inch ball and a load of one kilogram. Such rubber has a resiliency roughly similar to the resiliency of ordinary automobile tire tread rubber. The employment of the rubber jaws in the arrangement described permits the tucker to force the web between the jaws without difficulty while at the same time having the apparent effect of preventing the web from following the tucker from between the jaws even though the web is not positively gripped between the jaws until after the tucker is completely withdrawn. When the web is tucked between jaws, the web is forced into frictional engagement with the jaw tips rather than with the meeting faces of the jaws, and the web is not drawn taut around the edge of the tucker or between the tucker edge and the jaw tips. Instead, the web is rather gently bent into a smooth curving loop between the jaws and no sharp creasing or folding occurs until the jaws close on the web as above explained.

Tautness of the web during the tucking operation is prevented by (a) causing the web feed rolls to deliver the web (or webs) to the folding roll at a speed which is slightly greater than the normal surface speed of the folding rolls so as to develop a slight amount of slack in the web length extending from the anvil rolls 5 and 7 to the folding rolls 27 and 28, and (b) by so spacing the folding rolls 27 and 28 that the web is free to slip between them incident to the higher feed rate of the web as compared with the travel of the jaws and roll surfaces. Slippage of the web between the rolls while a jaw pair is carrying a tucked-in web portion downwardly results in the production of slack as indicated at S in Fig. 8. By providing slack both above and below the folding rolls, the tuck may easily be formed without drawing the web tight over any of the engaged jaw and tucker surfaces or edges. Also, the provision of frictional material jaw tips such as the resilient rubber members, aids in avoiding withdrawal of the tuck incident to withdrawal of the tucker and also aids retention of the tuck for a short time after opening of the jaws is started, whereby the web is more effectively pulled fairly taut over the top of the previously delivered stack of folded material.

By inspection of Figs. 8 to 13, inclusive, it will be seen that the web material required to form the tucked-in loop is obtained by taking up the incoming web slack resulting from the foregoing provision (a), and by pulling up on the web to take up some of the slack resulting from the aforesaid provision (b). By taking up the incoming slack, accumulation of web material immediately ahead of the folding rolls is prevented and tensioning of the incoming material is avoided because of the freely available slack S from which is drawn that portion of the material required to form the tucked-in loop which is in excess of the slack freely available from the incoming web portion. Possibly, most of the tuck material is drawn from the slack below the folding rolls, but in any event the tuck is formed by taking up slack material, thereby avoiding tensioning of any portion of the material. It should be observed that the slippage of the web between the folding rolls is slightly resisted by the roll surfaces so that the web does not drop down between the rolls as fast as it is delivered by the feed rolls; therefore, slack is produced both above and below the folding rolls.

The interfolded webs are delivered to a stack located immediately below the rolls 27 and 28, such stack being formed between guide posts or fingers 59 and 60 which are supported at their lower ends on transverse rods 61 and 62. The rods 61 and 62 are carried by bracket members such as 63 and 64 which are fastened to the side frames of the machine. The stack guide members 59 and 60 respectively, extend upwardly into suitable grooves 67 and 68 in the rolls 27 and 28, there being a sufficient number of these guide members 59 and 60 spaced across the lengths of the rolls to adequately support the tissue stack as shown in Fig. 1 (see also Fig. 2). The guides 59 and 60 are, in effect, extended downwardly by tissue channel-forming plates 69 and 70, which are also supported by attachment to the said brackets 63 and 64. The plate 70 is extended forwardly at an angle as indicated at 71 to form the top wall of a horizontally and downwardly extending chute or channel, the bottom wall of which is formed by the upper reach of a conveyor belt 72. The guide plate 69 terminates a short distance above the conveyor belt 72 as shown. The belt 72 is normally driven at a very slow rate of speed approximately corresponding to the rate of travel of the stack of tissues resulting from the addition of folded sheet after sheet to the top of the stack and downward feeding of the stack top by stripping and hold-down devices presently to be described.

Figure 5:
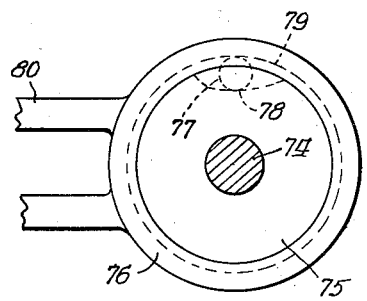
Fig. 5 is a detail view of an element appearing also in Fig. 1, showing means for operating one of the shafts of the machine.
Figure 6:
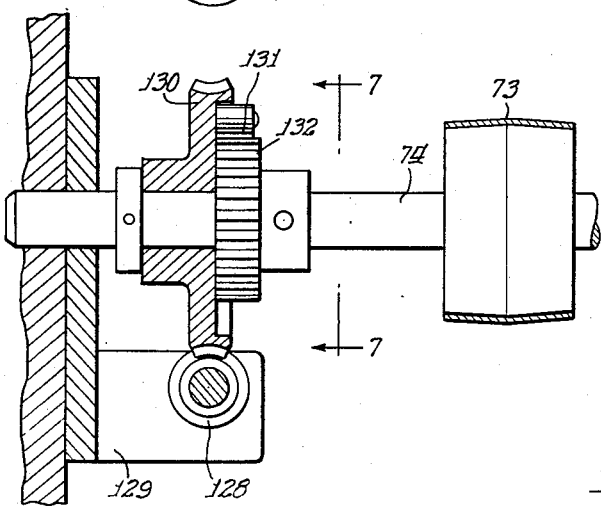
Fig. 6 is a section on the line 6—6 of Fig. 1 on an enlarged scale.
Figure 7:
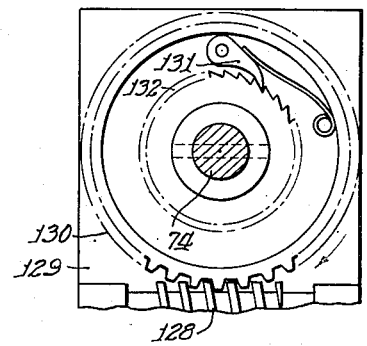
Fig. 7 is a section on the line 7—7 of Fig. 6.

The belt 72 is driven from a pulley 73 (Fig. 1) carried by a shaft 74 which is suitably journalled in the frame structure of the machine. At a suitable point in the length of the shaft 74 it has secured to it a clutch disc 75 (see Fig. 5) which is surrounded by a clutch ring 76. The clutch ring 76 is rocked and has an operative connection to the clutch disc 75 of such character that when the ring 76 moves in one direction, the disc 75 and shaft 74 will be advanced while movement of the ring 76 in the opposite direction will be independent of any movement of the disc 75 and shaft 74. Any suitable one-way clutch may be employed, and in this instance, it is represented as constituting a ball type of clutch embodying one or more balls or rollers 77 housed in recesses such as 78 in the disc 75 and grooves such as 79 in the ring 76. The bottoms of the recesses 78 are so related to the circumference of the disc that when the ring 76 turns in one direction, the balls will become wedged between the bottoms of the grooves 79 and the bottoms of the recesses 78 so as to effect unitary movement of the ring 76, the clutch disc 75 and shaft 74. Movement of the ring in the other direction serves, of course, to release the clutch balls or rollers so that reverse movement of the ring 76 is not imparted to the disc and shaft 74.

The ring 76 is provided with an arm 80 (see Fig. 1) which is slotted to adjustably receive a pivot block 81. The position of the pivot block 81 in the slotted arm may be adjusted and fixed by any suitable means such as an adjusting screw 82 and a lock nut 83 to thereby facilitate adjustment of the amount of travel imparted to the belt by each operative movement of the clutch ring. Rocking motion is imparted to the arm 80 by means of an eccentric 84 carried by a shaft 85 suitably journalled in the machine frame. An eccentric ring 86 surrounds the eccentric 84 and is connected to the clutch arm 80 by means of an arm 87 formed integrally with the ring and pivoted to the block 81.

The shaft 85 is continuously rotated by a suitable driving connection, one of which will hereinafter be explained.

The jaws 33 and 34 of the roll 27 and the jaws 36 and 37 of the roll 28 serve to alternately deposit web folds at the opposite sides of the stack. To insure stripping of the folds from the jaws which are automatically opened as they approach the vertical planes of the front and rear sides of the stack, there are provided a plurality of stripper arms 88 and 89 respectively associated with the rolls 27 and 28, the grooves 39 and 40 previously referred to, serve to receive such strippers in their elevated positions. The strippers 88 and 89 are carried respectively by shafts 90 and 91 which are suitably journaled in the side frames of the machine and these shafts together with their strippers are rocked in properly timed relation to the travel of the jaws of the respective rolls so that the end or finger portions 88a and 89a of the respective strippers will be operative to strip the folded webs from the jaws of the respective rolls and pack the folded web down on top of the stack of folded tissues.

The shaft 90 is rocked by means of an arm 92 which is carried by the shaft 90 and connected by means of a pin and slot connection to an arm 93 which has an eccentric ring 94 surrounding an eccentric disc 95 carried by a driven shaft 96. The shaft 91 is rocked by similar operating connections to an eccentric 97 carried by a driven shaft 98. The pin and slot connections in the arms serve to permit adjustment of the throw of the stripper fingers 88a and 89a and their timing may be adjusted by adjustment of the eccentric discs 95 and 97 about the shafts 96 and 98. In addition, the arm 92 on the shaft 90 and its counterpart on the shaft 91 may be adjustably connected to the shaft to permit adjustment of the position of the respective stripper fingers.

When one of the stripper fingers 88a or 89a is in a down position (in which the stripper 88a is illustrated in Fig. 1) the other stripper is in an elevated position. Also, the stripper fingers have an intermediate position in which they are both located about midway between their upper and lower positions. In order to hold the top of the stack against upward displacement when the stripper fingers 88a and 89a are in elevated relation to the normal top level of the stack, there are provided holding arms or hooks 99 and 100 respectively carried by shafts 101 and 102 which are rockably mounted in the frame sides of the machine. The arms 99 and 100 are provided at their upper ends with heads 103 and 104 respectively which move from a position overlying the respective margins of the stack to retracted positions clear of the top area of the stack. In their retracted positions the heads of the hold-down arms are received in the aforementioned grooves 39 and 40 at the sides of the respective stripper fingers 88a and 89a as indicated in Fig. 2. The hold-down arms 99 and 100 are secured to the shafts 101 and 102 which are rocked in such synchronism with the movement of the stripper fingers that the hold-down members are brought into operative engagement with the top of the stack before the associated stripper finger leaves the top of the stack. Therefore, the top of the stack is at all times restrained against upward movement beyond a desired level.

The shafts 101 and 102 may be rocked in the required timed relation to the operation of the strippers by any suitable means, such as typified by cams 105 and 106 carried by a frame carried stub shaft represented at 107. The cams are rotated by a suitable connection to one of the other rotating parts of the machine whereby the proper timed relationship will be maintained. The cams 105 and 106 respectively act against rollers carried at the free ends of arms 108 and 109 which are respectively secured to the rock shafts 101 and 102.

The arrangement is such that the top of the stack of interfolded sheets is located very close to the surface of the folding rolls whereby the folded web can be deposited on the top of the stack with a minimum of travel time. By maintaining the top of the stack very close to the surface of the interfolding rolls, the extent of movement required to be imparted to the stripping fingers and to the hold-down members is kept at a minimum whereby high speed operation of the machine is greatly facilitated. The top of the stack is so close to the surfaces of the folding rolls that light contact may occur where the stack bulges upwardly between adjacent strippers and hold-down hooks. The angular positions of the tuckers and the leading jaws are such that these parts more or less cam the stack top downwardly incident to their passage over the stack without applying any adverse sidewise force to the stack. Apparently, because of the high speed at which the rolls rotate, the stack does not have time to expand upwardly into the path of the trailing jaw.

Crepe tissue wadding and other material of the character which may be folded or interfolded by the described apparatus is apt to vary considerably in bulk incident to changes in atmospheric conditions. Under some conditions the tissue webs will have considerably greater bulk than under other conditions. Manufacturing processes may also have a bearing on the variation in the bulk of the crepe tissue which is delivered to the folding machine and this variation in bulk may occur within each separate run or roll of tissue delivered to the interfolding machine. These variations in bulk, especially an increase in bulk, will tend to alter the level of the top of the stack. While the level cannot actually be altered due to the positive action of the strippers and hold-down members, the variation does tend to create such expansive back pressure in the stack of folded tissues that normal operation of the strippers and hold-down fingers at high speeds is hampered.

The normal feed of the stack of interfolded tissues by the conveyor belt 72 can easily be designed to handle the tissues when delivered constantly under their minimum bulk conditions. However, when the bulk is increased the normal stack feed produced by the belt 72 will be slow with the result that the stack tends to expand at its top or receiving end. To prevent establishment of the indicated back pressure and thereby to maintain normal working conditions for the strippers, means have been provided for accelerating the speed of travel of the conveyor belt 72 when back pressure of the top of the stack requires it. This means is completely automatic.

The control means for accelerating the rate of travel of the stack feeding belt 72 consists in the provision of pressure sensitive stripper arms adjacent the ends of the roll 28 in place of normal stripper arms, such as represented by the arms 89. The pressure sensitive stripper arm arrangement (shown in Fig. 3) consists of a main arm portion 110 mounted on the shaft 91 so as to rock as a unit with the normal stripper arms 89. The arm 110 has a supplemental arm 111 pivoted on it as indicated at 112, the supplemental arm extending in opposite directions beyond the pivot 112. The inner end of the arm 111 is provided with a stripping finger 111a which corresponds to the stripping fingers 89a and the opposite end of the arm 111 is provided with an adjustable screw 113 which is adapted to actuate the control pin 114 of a suitable electric switch 115 which is mounted on a downward extension of the main arm 110. The screw 113 actuates the control pin of the switch through the agency of a flat leaf spring 116 so that great accuracy is not required in the matter of aligning the screw 113 and control pin 114 of the switch. A suitable tension spring 117 is anchored at its upper end to the top of the arm 111, extends downwardly through a hole in the arm and is connected to an adjusting screw 118 which is threaded through a lug 119 on the arm 110. The spring 117 serves to normally hold the supplemental arm 111 seated on the edge or seat 120 of the main arm 110. The tension of the spring 117 may be adjusted by appropriately adjusting the screw 118.

In the event that the stack of tissue begins to offer excessive resistance to the normal downward movement of the stripper fingers to the plane of the top of the stack, the arm 111 will be caused to rock on its pivot 112 against the tension of the spring 117. Such rocking movement will close the switch 115 and thereby establish an electric circuit which controls an electric motor 121 (Fig. 1) which is employed for driving the conveyor belt 72 independently of and in addition to the normal drive of the belt as already explained. The electric circuit closed by the switch 115 is suitably connected to a time delay relay 122 which may be any one of many suitable constructions, many of which are commercially available. The time delay relay 122 serves, each time it is actuated, to close for a definite time period, an electric circuit to a motor starter 123 which is suitably electrically connected to the motor 121. Hence, each time that the switch 115 is closed, the motor 121 will be actuated for a predetermined time period during which, through connections about to be described, the tissue stack feed belt 72 will be advanced. This time interval during which the motor 121 is operated may be any time interval which experience indicates to be desirable, for example, two or three seconds.

The motor 121 operates through a suitable speed reduction means indicated generally at 124 to drive a sprocket 125. A chain drive represented at 126 from the sprocket 125 to a shaft 127 serves to effect rotation of a worm gear 128 on the shaft 127. Said shaft 127 is suitably journaled in a bracket member 129 provided for that purpose and the worm gear 128 meshes with a worm wheel 130 which is rotatably mounted on the shaft 74. Rotation of the worm wheel 130 when driven by the motor 121, is imparted to the conveyor drive shaft 74 through the agency of a pawl 131 carried by the worm wheel and a ratchet 132 which is pinned or keyed to the shaft 74. The pawl 131 is spring pressed into engagement with the ratchet 132 and it is faced in such a direction that when the worm wheel 130 is driven by the motor 121 rotation will be imparted to the shaft 74 while rotation of the shaft 74 may be imparted from the normal driving shafts already explained without tending to drive the worm wheel reversely.

Each time that excessive back pressure develops in the receiving end of the tissue stack, one or both of the pressure sensitive stripper fingers (there being one at each end of the folder roll 28), will be actuated to produce the described accelerated feed of the stack to thereby relieve such pressure. Hence, the development of sufficient back pressure to interfere with normal operation of the strippers and hold-down fingers is not permitted to develop.

As shown in Fig. 2, there is a groove or recess in the middle portion of each of the rolls 27 and 28 which is approximately twice the width of the grooves 40 for receiving the normal stripper fingers 89 and the pressure sensitive stripper fingers 111a. These enlarged grooves receive stripper fingers 88b and 89b which are widened as compared with the normal strippers 88a and 89a so as to extend well beyond both sides of the longitudinal slit in the interfolded webs. This provision of widened fingers avoids the localization of pressure near the longitudinal slit; distortion of the webs at the slits which would tend to break the remaining bond is thereby avoided.

Figure 4:
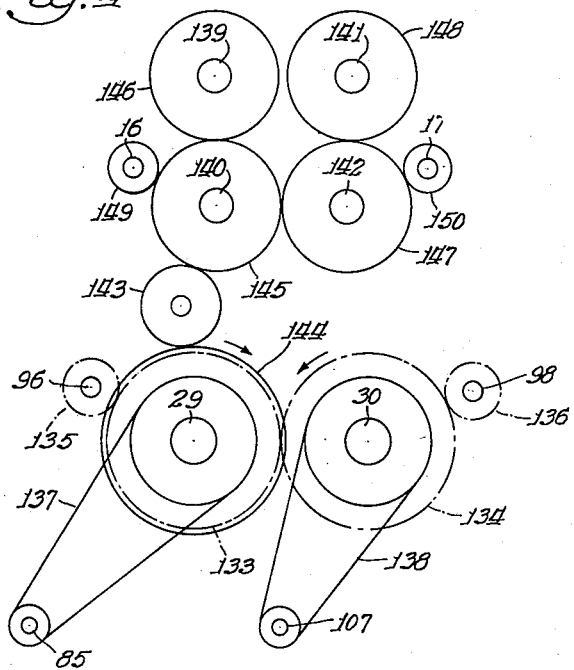
Fig. 4 is a more or less diagrammatic view illustrating an arrangement for driving the various operating parts of the mechanism.

One arrangement of driving connections for the various parts of the machine is illustrated in Fig. 4. For driving purposes one of the shafts 29 or 30 may be driven by a suitable chain drive connection to an electric motor, this primary drive being not shown. The shafts 29 and 30 are geared together by gears represented at 133 and 134 secured to the respective shafts 29 and 30. The shafts 96 and 98 may be driven in properly timed relation to the drive of the interfolding rolls by means of gears represented at 135 and 136 carried by the respective shafts 96 and 98 and meshing with the gears 133 and 134 respectively. For driving the shaft 85 from which the normal feed of the tissue stack is obtained, there may be provided a chain drive represented at 137 from a suitable sprocket mounted on the roll shaft 29 to engage a suitable sprocket mounted on the eccentric shaft 85. The hold-down actuating cams which are carried by the shaft 107 may also be driven by a chain 138 which engages suitable sprockets carried by the respective shafts 30 and 107.

The shafts 139 and 140 of the cutter roll pair 3 and the shafts 141 and 142 of the cutter roll pair 2 may be driven by means of an idler gear 143 which meshes with a gear 144 on the interfolder roll shaft 29 and a gear 145 on the cutter roll shaft 140. The gear 145 meshes with another gear 146 on the knife roll shaft 139 and with a gear 147 on the cutter roll shaft 142, said gear 147 also meshing with a gear 148 on the cutter roll shaft 141. The innermost rolls of the web feed roll pairs 13 and 14 may be driven from the respectively adjacent gears 145 and 147 of the anvil rolls through the agency of gears 149 and 150 secured to the respective feed roll shafts and meshing with the respectively adjacent anvil roll gears 145 and 147. The outer rolls 15 and 18 of the tissue feed roll pairs may be frictionally driven from the inner rolls, said outer rolls being arranged to gravitate toward the driven inner rolls or provided with spring means urging them toward said inner rolls. The gears and sprockets for the chain drives are, of course, properly selected as to their pitch diameters and number of teeth to produce the required rotation of the various driven parts.

The described machine is operable at much higher speeds than have heretofore been attained in folding machines of the general character described. Operation at a speed to produce 800 folds per minute (400 folds at each side of the stack) is entirely feasible and practical, and it appears that some increase may be anticipated.

Some of the main factors which make possible this high speed operation comprise the simplification of the folding rolls to employ fixed tuckers, and gripping jaw pairs embodying only one movable jaw with attendant simplification of operating mechanism; the avoidance or elimination of snap action mechanisms facilitates said high speed operation with a minimum of shock and strain on the machine and the web, thereby attaining durability of the machine, freedom from breakdowns of the machine and the web, and quietness of operation; the free and untensioned web arrangement which permits the tucks to be made in the described manner without pulling the web taut at any point whereby bond breakage is avoided; the use of rubber friction tips to control the tucked-in web, i. e. to prevent withdrawal of the web by the tucker incident to retraction of the latter from between a pair of jaws; the use of said friction jaw tips to aid in retaining the folds in the jaws against premature discharge therefrom upon being opened, even though opening of the jaws is started in advance of the desired point of fold discharge—the nearly radial or sharply inwardly folded position of the folds between the jaws probably also helps to insure web fold retention in the jaws sufficiently to draw the deposited web smoothly across the stack without also pulling the web from under the strippers or hold-down fingers at the opposite side of the stack; the resilient character of the jaw tips which permits the jaws to come tightly together to grip the webs without requiring extreme, if not practically unobtainable, accuracy in respect of the size and extent of movement of the movable jaws in apparatus designed to operate at the indicated high speed; positioning of the top of the stack of folded material close to the folding roll surfaces so as to reduce the extent of travel required of the strippers and of the folded web upon its release from the folding jaws; and maintenance of a substantially constant pressure reaction of the folded stack on the stripper fingers. There are perhaps other factors, but those mentioned are probably the most important.

In the arrangement described, the tuckers and jaws are so related that they do not pinch the web between them; in some instances, it may be desirable that one or the other of the jaws be so related to the tucker as to more or less brush or wipe the web from the tucker incident to recession of the tucker from between the jaws. Material which may be handled by the described apparatus (subject to suitable adjustment of the spacing of the folding rolls to preserve the required paper slip between the rolls) may be typified by: (a) tissue paper having a dryer basis weight of about 7.64 pounds per ream (480 sheets) 24" x 36"; (b) said tissue paper (a) after creping so as to have a basis weight of about 10.5 pounds per ream of sheets 24" x 36"; and (c) double ply creped tissue paper such as used for making commercially available facial tissues, the basis weight for such double ply material being about 19.1 pounds per ream of 480 double ply sheets 24" x 36". These basis weights are set forth merely as typical of the kind of light-weight and flimsy material which can be successfully folded and interfolded; limitation of operativeness to these weights is not to be implied from this recitation.

Various changes in the described apparatus may be made, and the apparatus may be employed for either Z-folding or interfolding purposes (this depending on the number and arrangement of webs fed to the folding rolls), while retaining the principles of the invention. In the following claims, reference to Z-folding will, of course, include interfolded sheets as produced by the described apparatus since the interfolded sheets include, in effect, two Z-folded webs.

I claim:

1. In a rotary folding machine of the class described, the combination of a pair of folding rolls mounted for rotation in opposite directions, means for feeding a web to be folded to said folding rolls, a pair of jaws and a tucker carried by each of said rolls, means for driving said rolls in such timed relation that the tucker of each roll enters between the jaws of the other and is withdrawn therefrom as an incident to the rotation of the rolls, means independent of said tucker for holding the jaws in spaced, nongripping relation to the cooperating tucker when the latter is disposed between the jaws and for causing said jaws to close and grip the tucked in web material immediately following withdrawal of the tucker from between the jaws, and means for subsequently reopening said jaws to discharge the tucked in material.

2. In rotary folding mechanism of the class described, the combination of a pair of oppositely rotatable rolls, means for delivering a paper web between said rolls, each of said rolls being provided with a pair of jaws and with a tucker, one of said jaws being movable relative to the other to open and close the jaws and the tucker of each roll being adapted to cooperate with the jaws of the other to tuck the web between the jaws, and cam means for controlling the opening and closing of said jaws and arranged to maintain said jaws in open position to freely receive the tucked-in web without gripping the web between the jaws or between either jaw and the tucker and to effect closing of said jaws to grip the tucked-in web portion immediately following withdrawal of the tucker from between the jaws.

3. In a rotary folding machine of the class described, the combination of a pair of rotatably mounted folding rolls, means for rotating said rolls in opposite directions, means for delivering a web of material to said rolls, a pair of jaws and a tucker carried by each of said rolls in such relationship that upon rotation of the rolls, the tucker of each roll is operative to tuck said material between the jaws of the other, said jaws being operative to grip and carry the tucked-in material, said web-delivering means being actuated so as to deliver said web at a rate of travel which is greater than the rate of travel of said jaws and said rolls being spaced from each other sufficiently to permit the web to slip between the rolls at a rate of travel which is greater than said rate of jaw travel, thereby to produce slack in the web portion extending from a pair of jaws which are carrying said tucked-in web portion and the zone in which said tuckers tuck the web into the jaws, whereby material required in said tuck is freely available from said slack without tensioning the web.

4. In a rotary folding machine of the class described, the combination of a pair of rotatably mounted folding rolls, means for rotating said rolls in opposite directions, means for delivering a web of material to said rolls, a pair of jaws and a tucker carried by each of said rolls in such relationship that upon rotation of the rolls, the tucker of each roll is operative to tuck said material between the jaws of the other, said jaws being operative to grip and carry the tucked-in material, said web-delivering means being actuated so as to deliver said web at a rate of travel which is greater than the rate of travel of said jaws and said rolls being spaced from each other sufficiently to permit the web to slip between the rolls at a rate of travel which is greater than said rate of jaw travel but less than the rate at which said material is delivered to said rolls, thereby to produce slack in the web portion extending from a pair of jaws which are carrying said tucked-in web portion and the zone in which said tuckers tuck the web into the jaws, and between the web receiving side of said rolls and said delivering means, whereby material required in said tuck is freely available from said slack without tensioning the web.

5. In a rotary folding machine of the class described, the combination of a pair of rotatably mounted folding rolls, means for rotating said rolls in opposite directions, means for delivering a web of material to said rolls, a pair of jaws and a tucker carried by each of said rolls in such relationship that upon rotation of the rolls, the tucker of each roll is operative to tuck said material between the jaws of the other, said jaws being operative to grip and carry the tucked-in material, means for controlling the opening and closing of said jaws and arranged to maintain said jaws in open position to freely receive the tucked-in web without gripping the web between the jaws or between either jaw and the tucker and to effect closing of the jaws to grip the tucked-in web portion immediately following withdrawal of the tucker from between the jaws, said web delivering means being actuated so as to deliver said web at a rate of travel which is greater than the rate of travel of said jaws and said rolls being spaced from each other sufficiently to permit the web to slip between the rolls at a rate of travel which is greater than said rate of jaw travel, thereby to produce slack in the web portion extending from a pair of jaws which are carrying said tucked-in web portion and the zone in which said tuckers tuck the web into the jaws, whereby material required in said tuck is freely available from said slack without tensioning the web, and said jaws being provided with friction material tips which serve to resist slippage of the tucked in material out of the jaws during withdrawal of the tucker from said jaws.

6. In a rotary folding machine of the class described, the combination of a pair of rotatably mounted folding rolls, means for rotating said rolls in opposite directions, means for delivering a web of material to said rolls, a pair of jaws and a tucker carried by each of said rolls in such relationship that upon rotation of the rolls, the tucker of each roll is operative to tuck said material between the jaws of the other, said jaws being operative to grip and carry the tucked-in material, means for controlling the opening and closing of said jaws and arranged to maintain said jaws in open position to freely receive the tucked-in web without gripping the web between the jaws or between either jaw and the tucker and to effect closing of the jaws to grip the tucked-in web portion immediately following withdrawal of the tucker from between the jaws, said web-delivering means being actuated so as to deliver said web at a rate of travel which is greater than the rate of travel of said jaws and said rolls being spaced from each other sufficiently to permit the web to slip between the rolls at a rate of travel which is greater than said rate of jaw travel but less than the rate at which said material is delivered to said rolls, thereby to produce slack in the web portion extending from a pair of jaws which are carrying said tucked-in web portion and the zone in which said tuckers tuck the web into the jaws, and between the web receiving side of said rolls and said delivering means, whereby material required in said tuck is freely available from said slack without tensioning the web, and said jaws being provided with friction material tips which serve to resist slippage of the tucked-in material out of the jaws during withdrawal of the tucker from said jaws.

7. In the art of Z-folding a weakly bonded transversely slitted web by apparatus embodying travelling gripping jaws and a travelling tucker which tucks the web between the jaws during predetermined, cooperating portions of the paths of travel of said jaws and tucker, the step of providing free slack in the web between said cooperating portions of said paths of travel and a tuck in the web carried by a pair of jaws immediately beyond said cooperating portions, thereby to provide available free material for the tuck in the web so as to avoid tensioning of the material and breakage of said bonds incident to the tucking of the web as aforesaid.

8. In the art of Z-folding a weakly bonded transversely slitted web by apparatus embodying travelling gripping jaws and a travelling tucker which tucks the web between the jaws during predetermined, cooperating portions of the paths of travel of said jaws and tucker, the step of providing free slack in the web in both directions from said cooperating portions of said paths of travel, thereby to provide available free material for the tuck in the web so as to avoid tensioning of the material and breakage of said bonds incident to the tucking of the web as aforesaid.

9. In the art of Z-folding a weakly bonded transversely slitted web by apparatus embodying travelling gripping jaws and a travelling tucker which enters between said jaws and is retracted therefrom to tuck the web between the jaws during predetermined, cooperating portions of the paths of travel of said jaws and tucker, the steps of providing free slack in the web in at least one direction from said cooperating portions of said paths of travel, thereby to provide available free material for the tuck in the web so as to avoid tensioning of the material and breakage of said bonds incident to the tucking of the web as aforesaid, maintaining said jaws out of web gripping relationship to said tucker during said cooperative portions of the paths of travel of said jaws and tucker, and after said tucker is retracted, closing the jaws to grip the tucked in portions of the web.

10. In the art of Z-folding a weakly bonded transversely slitted web by apparatus embodying travelling gripping jaws and a travelling tucker which enters between said jaws and is retracted therefrom to tuck the web between the jaws during predetermined, cooperating portions of the paths of travel of said jaws and tucker, the steps of maintaining said jaws out of web gripping relationship to said tucker during said cooperative portions of the paths of travel of said jaws and tucker, and after said tucker is retracted, closing the jaws to grip the tucked-in portions of the web.

11. In a rotary folding machine of the class described, the combination of a pair of rotatably mounted folding rolls, means for delivering a web of material to said rolls, a pair of jaws and a tucker carried by each of said rolls in such relationship that upon rotation of the rolls, the tucker of each roll is operative to tuck said material between the jaws of the other, said jaws being operative to grip and carry the tucked-in material, means for controlling the opening and closing of said jaws and arranged to maintain said jaws in open position to freely receive the tucked-in web without gripping the web between the jaws or between either jaw and the tucker and to effect closing of the jaws to grip the tucked-in web portion immediately following withdrawal of the tucker from between the jaws, and said web delivering means being actuated so as to deliver said web at a rate of travel which is greater than the rate of travel of said jaws and said rolls being spaced from each other sufficiently to permit the web to slip between the rolls at a rate of travel which is greater than said rate of jaw travel, thereby to produce slack in the web portion extending from a pair of jaws which are carrying said tucked-in web portion and the zone in which said tuckers tuck the web into the jaws, whereby material required in said tuck is freely available from said slack without tensioning the web.

REINHARDT N. SABEE.

REFERENCES CITED

The following references are of record in the file of this patent:

UNITED STATES PATENTS

| Number | Name | Date |
|---|---|---|
| 1,003,446 | Gauch | Sept. 19, 1911 |
| 1,015,580 | Nichols | Jan. 23, 1912 |
| 1,756,392 | Smith | Apr. 29, 1930 |
| 2,057,879 | Campbell | Oct. 20, 1936 |
| 2,246,336 | Wyrick | June 17, 1941 |
| 2,449,663 | Marcalus | Sept. 21, 1948 |
| 2,468,254 | Deloye | Apr. 26, 1949 |

FOREIGN PATENTS

| Number | Country | Date |
|---|---|---|
| 385,107 | Great Britain | Dec. 22, 1932 |